US012581026B2

(12) United States Patent
Jeng et al.

(10) Patent No.: US 12,581,026 B2
(45) Date of Patent: Mar. 17, 2026

(54) POWER SAVING METHOD FOR HIGH DEFINITION MULTIMEDIA INTERFACE

(71) Applicant: MEDIATEK INC., Hsin-Chu (TW)

(72) Inventors: You-Tsai Jeng, Hsinchu (TW);
Chia-Hao Chang, Hsinchu (TW);
Meng-Chung Hsiao, Hsinchu (TW);
Yi-Cheng Chen, Hsinchu (TW);
Chih-Wei Chou, Hsinchu (TW);
Kai-Wen Yeh, Hsinchu (TW);
Chi-Chih Chen, Hsinchu (TW);
Yu-Sung Chang, Hsinchu (TW);
Chen-Yi Liu, Hsinchu (TW);
Kuo-Chang Cheng, Hsinchu (TW);
Chin-Lung Lin, Hsinchu (TW);
Ko-Yin Lai, Hsinchu (TW); **Tai-Lai
Tung**, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/628,837

(22) Filed: Apr. 8, 2024

(65) Prior Publication Data

US 2025/0317528 A1     Oct. 9, 2025

(51) Int. Cl.
*G06F 1/00*        (2006.01)
*H04N 5/63*        (2006.01)
*H04N 7/015*       (2006.01)

(52) U.S. Cl.
CPC .............. *H04N 5/63* (2013.01); *H04N 7/015* (2013.01)

(58) Field of Classification Search
CPC .................................. H04N 5/63; H04N 7/015
See application file for complete search history.

(56) References Cited

U.S. PATENT DOCUMENTS

| | | | | |
|---|---|---|---|---|
| 11,205,401 | B1 * | 12/2021 | Jeng | G09G 5/12 |
| 11,770,583 | B1 * | 9/2023 | Jeng | H04N 21/43635 |
| | | | | 348/521 |
| 2017/0092226 | A1 * | 3/2017 | Park | H04N 21/43635 |
| 2022/0109908 | A1 * | 4/2022 | Chan | H04N 21/43635 |
| 2022/0150555 | A1 * | 5/2022 | Chan | H04N 21/43635 |
| 2023/0154411 | A1 * | 5/2023 | Lee | G06V 40/1306 |
| | | | | 345/204 |

(Continued)

FOREIGN PATENT DOCUMENTS

| | | |
|---|---|---|
| TW | 202331588 A | 8/2023 |
| TW | I810640 B | 8/2023 |
| TW | I826242 B | 12/2023 |

OTHER PUBLICATIONS

Neal Kendall, Essentials of HDMI 2.1 Protocols for 48Gbps Transmission, Teledyne Lecroy, Dec. 19, 2017, XP055729362 ,2017/12/19.

*Primary Examiner* — Mohammed H Rehman
(74) *Attorney, Agent, or Firm* — Winston Hsu

(57) ABSTRACT

A power-saving method for switching High Definition Multimedia Interface (HDMI) ports on a sink device. The sink device has at least one HDMI port. The sink device is used to receive data frames via a fixed rate link (FRL). The method includes turning off a power of an HDMI port for a power-off period upon detecting an active pixel, and turning on the power of the HDMI port for a power-on period upon completion of the power-off period. The power-on period includes at least a scrambler reset period (TSR) and a high bandwidth digital content protection (HDCP) period.

16 Claims, 11 Drawing Sheets

(56) References Cited

U.S. PATENT DOCUMENTS

| | | | |
|---|---|---|---|
| 2023/0254059 A1* | 8/2023 | Hyakudai | H04J 3/1676 |
| | | | 370/212 |
| 2024/0029658 A1* | 1/2024 | Kim | A61B 5/0059 |

* cited by examiner

| Char block 3 | SSB /SR | Character block 0 | | Character block 1 | | Character block 2 | | Character block 3 | | SSB /SR | Char block 0 |

FIG. 4

Turn on the power of the HDMI port — S601

Detect the scramble reset character to descramble a current data frame — S602

Obtain HDCP information — S603

Detect a first active pixel — S604

Turn off the power of the HDMI port for a power-off period — S605

POWER SAVING METHOD FOR HIGH DEFINITION MULTIMEDIA INTERFACE

BACKGROUND

The invention relates to High Definition Multimedia Interface (HDMI), and in particular, to a power saving method for the high definition multimedia interface.

High Definition Multimedia Interface (HDMI) is an audio/video connector interface for transmitting uncompressed video data and compressed or uncompressed digital audio data from an HDMI source device such as a display controller or a personal computer to an HDMI sink device such as a computer monitor, a digital television, or a digital audio device. The HDMI sink device may include multiple HDMI ports to receive video content from different HDMI source devices, respectively. One of the HDMI ports in the HDMI sink device can be selected to provide the video content at any given time, and thus, the HDMI sink device would switch to another HDMI port if it is intended to change the video content for display.

In the prior art, when switching between the HDMI ports, users need to wait for a few seconds before the new screen is displayed, resulting in poor user experience. In the prior art, to switch the HDMI ports without waiting, the power of each HDMI port needs to stay on, thus increasing power consumption.

SUMMARY

An embodiment of the present invention discloses a power-saving method for switching High Definition Multimedia Interface (HDMI) ports on a sink device. The sink device has at least one HDMI port. The sink device is used to receive data frames via a fixed rate link (FRL) in a fixed rate link (FRL) mode. The method includes turning off a power of an HDMI port for a power-off period upon detecting an active pixel of the data frames in the FRL mode, and turning on the power of the HDMI port for a power-on period of the data frames in the FRL mode upon completion of the power-off period. The power-on period of the data frames in the FRL mode includes at least a scrambler reset period (TSR) and a high bandwidth digital content protection (HDCP) enable information.

According to another embodiment of the invention, a High Definition Multimedia Interface (HDMI) sink device includes at least one HDMI port and a controller. The controller is coupled to the at least one HDMI port and used to turn off a power of an HDMI port for a power-off period upon detecting an active pixel, and turn on the power of the HDMI port for a power-on period upon completion of the power-off period. The power-on period includes at least a scrambler reset period (TSR) and a HDCP enable information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 shows a schematic diagram of the super block in FIG. 3.

DETAILED DESCRIPTION

Figure 1:
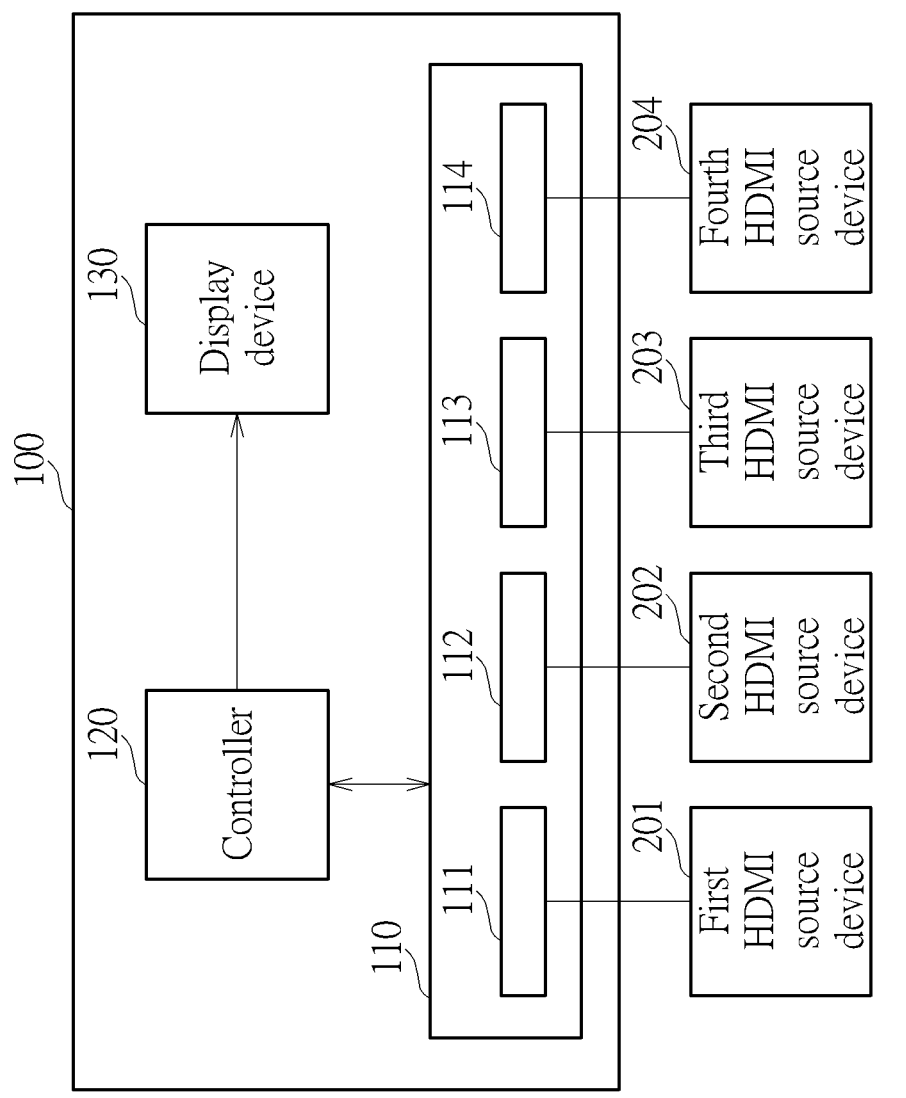
FIG. 1 shows a block diagram of a High Definition Multimedia Interface (HDMI) sink device according to an embodiment of the present invention.

FIG. 1 shows a block diagram of a High Definition Multimedia Interface (HDMI) sink device 100 according to an embodiment of the present invention. The HDMI sink device 100 may include an HDMI interface 110, a controller 120, and a display device 130. The HDMI interface 110 may include a HDMI ports 111 to 114 coupled to HDMI source devices 201 to 204, respectively. The HDMI source devices 201 to 204 may provide different video content. For example, the HDMI source device 201 may be PlayStation 5, the HDMI source device 202 may be a set-top box, the HDMI source device 203 may be a personal computer, and the HDMI source device 204 may be unused. The HDMI ports 111 to 113 may receive video content from the HDMI source devices 201 to 203, respectively.

The HDMI ports 111 to 114 may receive power to operate, and the power to each of the HDMI ports 111 to 114 may be turned off if not used, so as to save power usage. The controller 120 may be coupled to the HDMI ports 111 to 114 and the display device 130, and may control the power of the HDMI ports 111 to 114 when switching between the HDMI ports to display for different HDMI source devices. For example, if the HDMI port 111 is selected, the controller 120 may continuously turn on the power to the HDMI port 111 and turn off the power to the HDMI ports 112 to 114 when not used, so as to keep the HDMI port 111 operating to decode and deliver data frames from the HDMI source device 201 to the display device 130 while reducing power wastage of the HDMI ports 112 to 114. The display device 130 may be a liquid crystal display, a light-emitting diode (LED) display, or other electronic displays for displaying the video according to the decoded data frames.

The HDMI sink device 100 may receive data frames via a fixed rate link (FRL) in a fixed rate link (FRL) mode. FRL is a signaling technology to replace the traditional Transition Minimized Differential Signaling (TMDS) in HDMI. FRL employs three lanes or four lanes to provide the maximum bandwidth up to 48 Gbps, whereas TMDS uses three lanes to provide the maximum bandwidth up to 18 Gbps. The data frames are transmitted between the HDMI sink device 100 and the HDMI source devices 201 to 204 via a FRL 3-lane mode or a FRL 4-lane mode.

Figure 2:
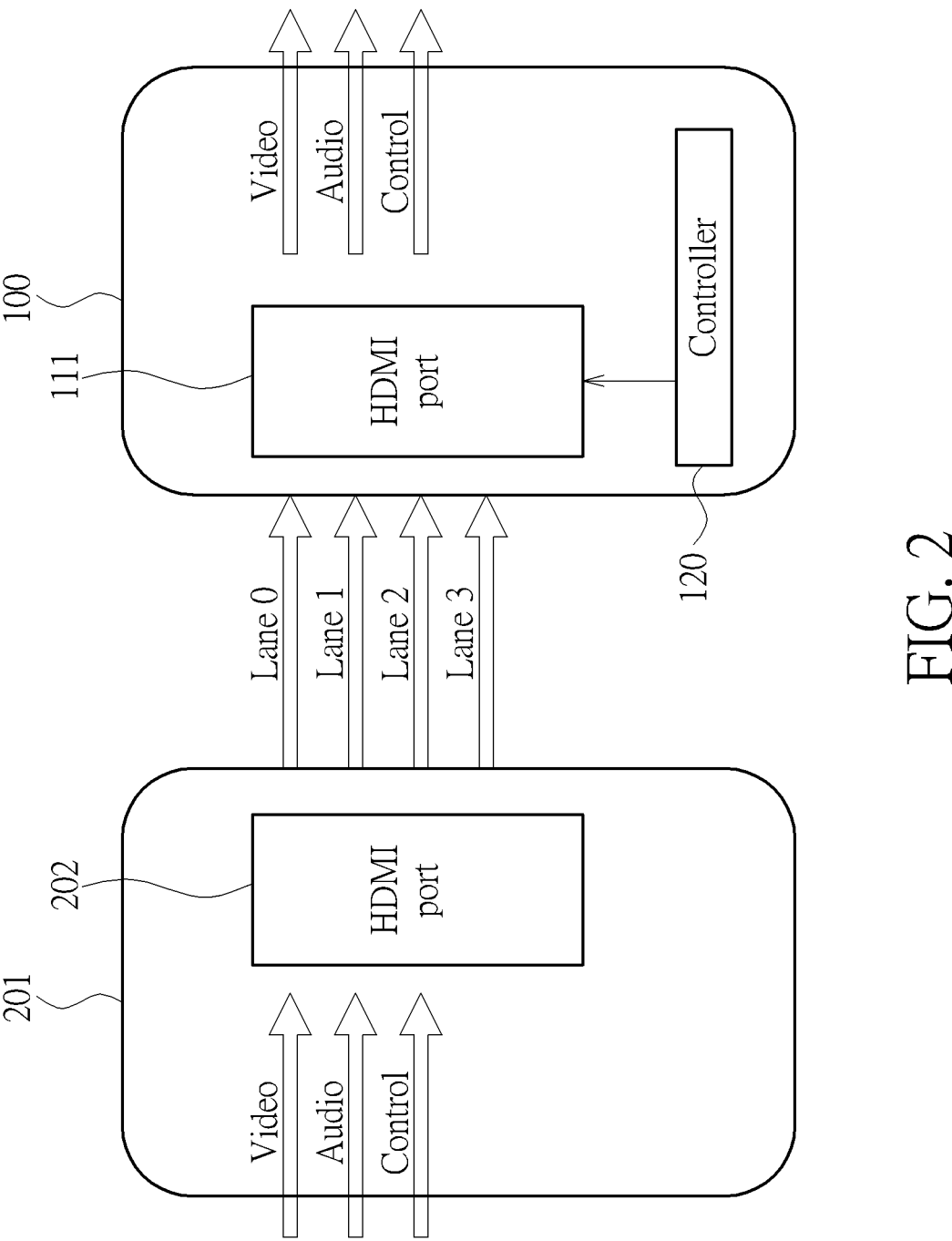
FIG. 2 shows a schematic diagram of connections between the HDMI sink device and the source device in FIG. 1 in the FRL 4-lane mode.

FIG. 2 shows a schematic diagram of connections between the HDMI sink device 100 and the HDMI source device 201 in the FRL 4-lane mode, but the invention is not limit thereto. In the FRL 4-lane mode, the HDMI source device 201 transmits data frames using Lane 0 to Lane 3 to the HDMI sink device 100 at a fixed data rate.

The HDMI source device 201 receives video, audio and control signals. The HDMI source device 201 may include an HDMI port 202 as a transmitter to transmit the video, audio and the control signal via Lane 0 to Lane 3. The HDMI port 111 in the HDMI sink device 100 may be a receiver and configure to receive the video, audio and the control signal from the HDMI port 202. If the HDMI port 111 is selected for display, the controller 120 may continuously turn on the power of the HDMI port 111. If the HDMI port 111 is not selected for display, the controller 120 may turn on the power of the HDMI port for a power-on period to acquire High-bandwidth Digital Content Protection (HDCP) information, and then turn off the power of the HDMI port 111 for a power-off period to reduce power wastage. Details of HDCP information, the power-on period and the power-off period will be discussed in the subsequent paragraphs.

Figure 3:
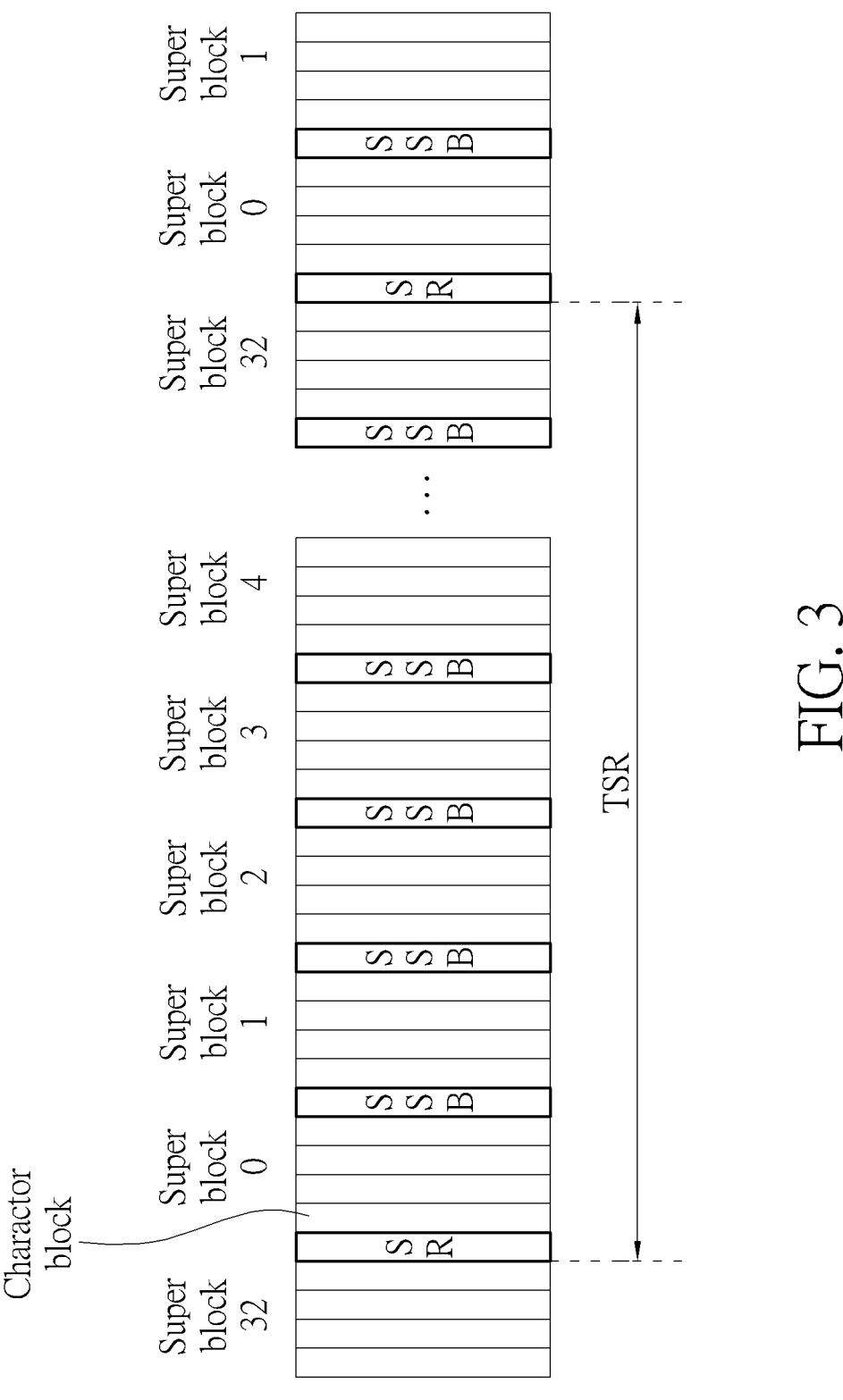
FIG. 3 shows a schematic diagram of the super blocks in the scrambler reset period (TSR).

The video data, audio data and/or control data may be encapsulated in the data frames to be transmitted over Lane 0 to Lane 3. Each data frame contains a plurality of super blocks. FIG. 3 shows a schematic diagram of 33 super blocks (Super Blocks 0 to 32) in a scrambler reset period TSR. Each super block starts with a start character following by 4 character blocks. The start character may be a scramble reset (SR) character or a start super block (SSB), and may be transmitted on Lane0 to Lane3 simultaneously for character alignment. In each scrambler reset period TSR, the SR character occurs in Super Block 0 and the SSB character occurs in Super Blocks 1 to 32. That is, the SR character occurs periodically every 33 superblocks. In Super Block 0, the SR character precedes 4 character blocks, and the SR character is transmitted on Lane0 to Lane3 simultaneously upon start of Super Block 0. In each of Super Blocks 1 to 32, the SSB character precedes 4 character blocks, and the SSB character is transmitted on Lane0 to Lane3 simultaneously upon start of each of Super Blocks 1 to 32.

Figure 4:
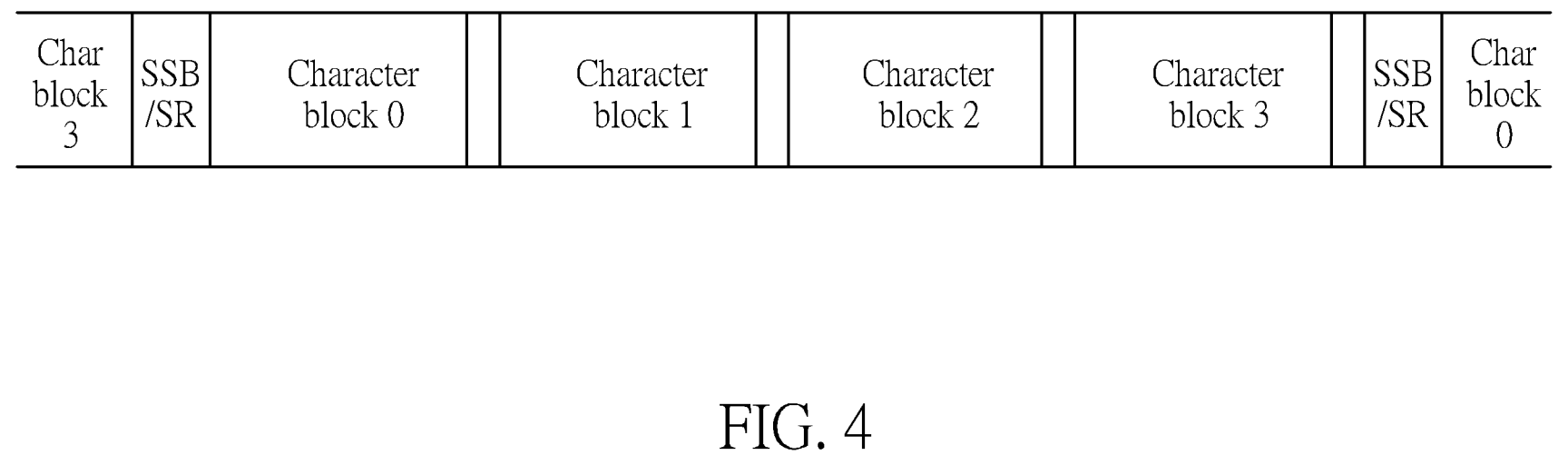

FIG. 4 shows a schematic diagram of the super block in FIG. 3. The super block contains the start character (SSB or SR character) and 4 character blocks (Character Block 0 to Character Block 3). The start character is located at the beginning of the super block following by Character Block 0 to Character Block 3. Each character block contains 510 FRL characters, and each FRL packet is fixed in data length and contains video data, audio data and/or control data.

Figure 5:
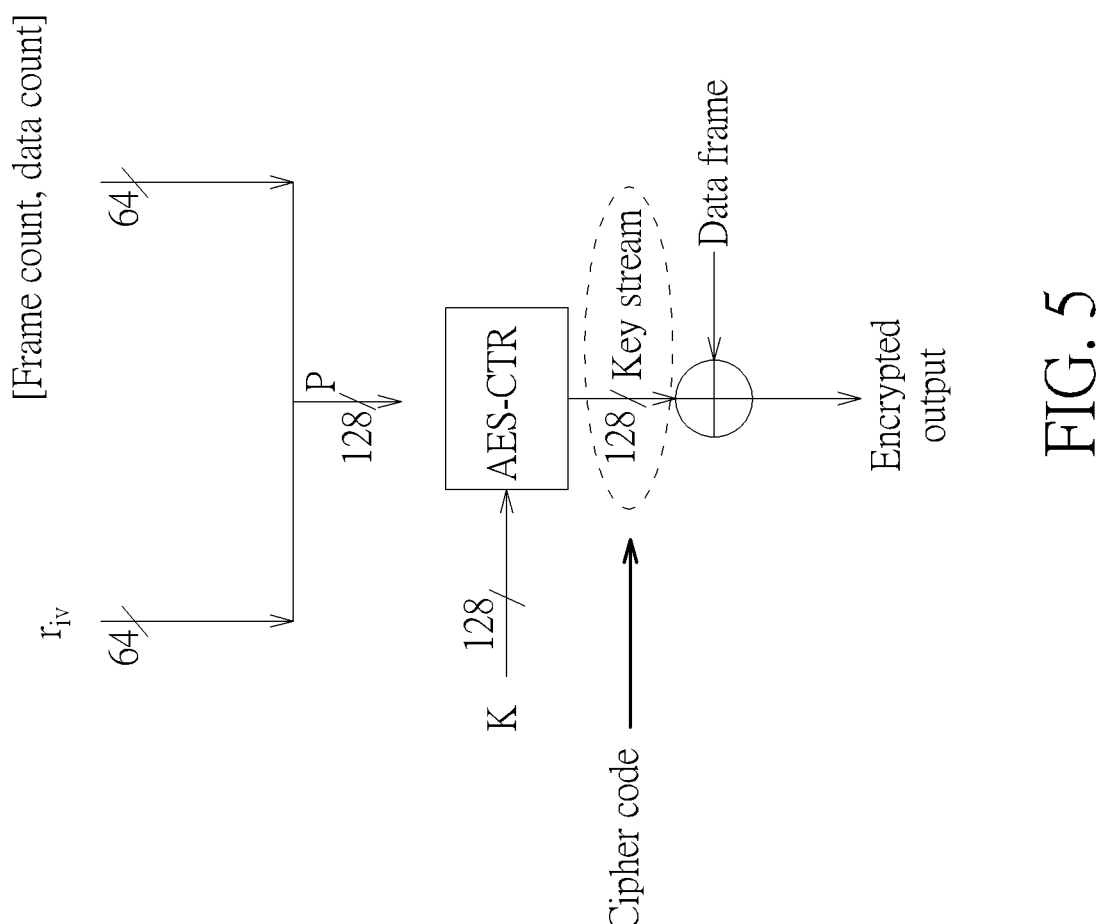
FIG. 5 shows a schematic diagram of a flow of high-bandwidth digital content protection (HDCP) encryption.

FIG. 5 shows a schematic diagram of a flow of HDCP encryption. The HDMI source device 201 may perform HDCP encryption on data frames to provide digital protection and transmit the HDCP-encrypted data frames to the HDMI sink device 100. After the HDMI sink device 100 receives the HDCP-encrypted data frames, the HDCP-encrypted data frame is decrypted for subsequent use.

At the HDMI source device 201, The HDCP-encrypted data frame is generated using Advanced Encryption Standard counter mode (AES-CTR) according to a frame count and a data count. The frame count is a 38-bits number indicating the number of frames processed and the data count is a 26-bit number indicating the number of the 5-pixel units processed. For example, the initial value of frame count is 0 and becomes 1 when the first frame is encrypted.

The initial value of data count is 0 at the beginning of the frame, and become 1 when the first set of pixels is encrypted, a set of pixels may contain 5 pixels. The data count may be reset at the window of opportunity time slot. The $r_{iv}$ is an initial vector. The combination of the initial vector, the frame count and the data count may be a 128-bit input P. The denotation K is the key to perform AES-CTR. After performing AES-CTR, a key stream is generated and may be used as a cipher code to encrypt the data frames. Accordingly, the cipher code is generated according to the frame count and the data count.

To achieve HDCP decryption, the frame count and data count of the data frame need to be synchronized to generate the cipher code at the HDMI sink device 100. Even if a HDMI port is not selected, the power of the HDMI port is still powered on during a short period of time to obtain the HDCP information, so as to synchronize the frame count and the data count for HDCP decryption. The information of the frame count and data count may be generated according to the HDCP information, the HDCP information being acquired at a HDCP period in a data frame, as shown in FIGS. 7 to 11. Details of acquisition of the HDCP information will be explained in the subsequent paragraphs.

Figure 6:
FIG. 6 shows a flowchart of a power-saving method for switching HDMI ports on the HDMI sink device in FIG. 1.
Figure 6:
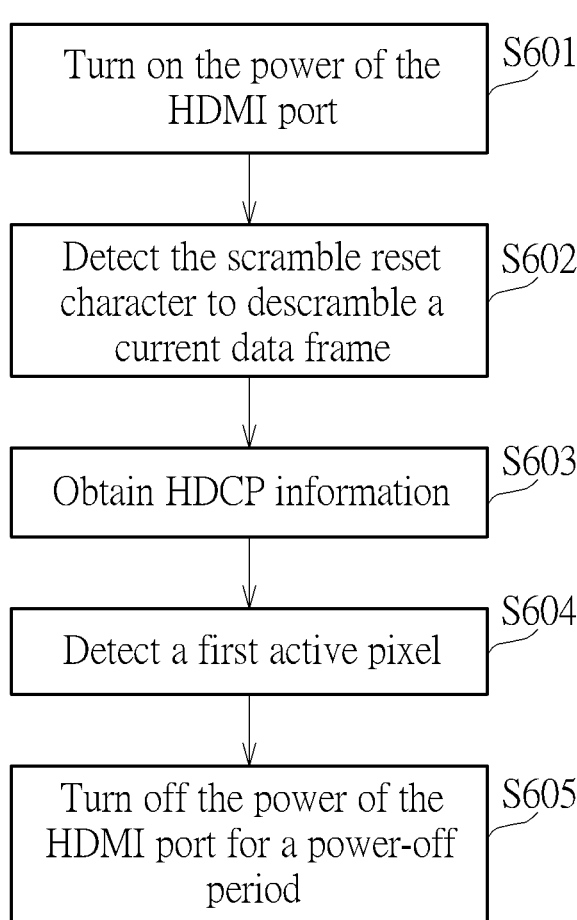

FIG. 6 shows a flow chart of a power-saving method 6 for switching HDMI ports on the HDMI sink device 1. The power-saving method 6 comprises Steps S601 to S606. Any reasonable step change or adjustment is within the scope of the disclosure. Steps S601 to S606 are explained as follows:

Step S601: Turn on the power of the HDMI port;

Step S602: Detect the scramble reset character to descramble a current data frame;

Step S603: Obtain HDCP information;

Step S604: Detect a first active pixel;

Step S605: Turn off the power of the HDMI port for a power-off period.

Figure 7:
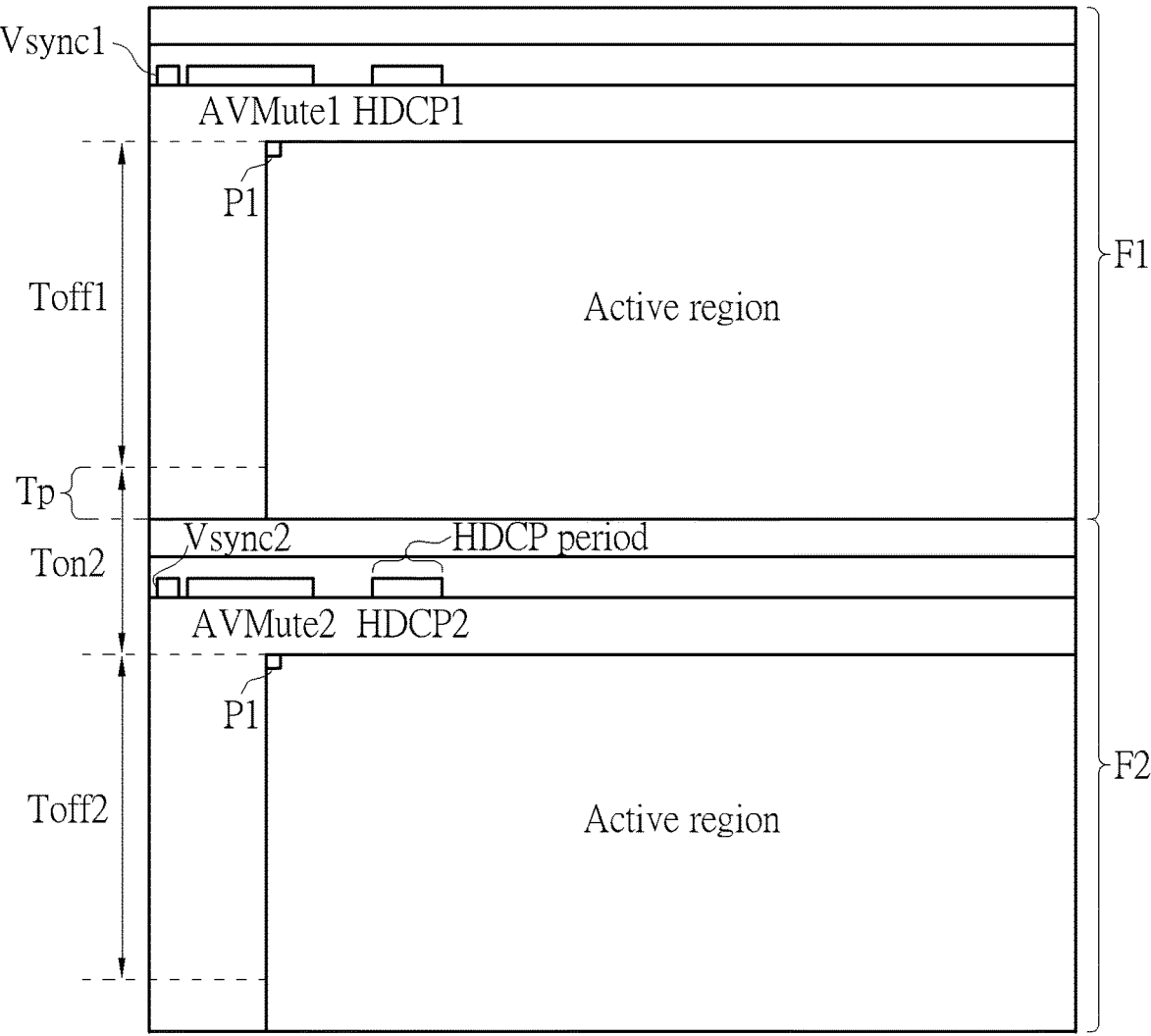
FIG. 7 shows a schematic diagram of a previous data frame and a current data frame of the HDMI sink device in FIG. 1 according to an embodiment of the present invention.

The power-saving method 6 is explained with reference to the HDMI sink device 100 and data frames in FIG. 7, the HDMI port 111 serving as the target HDMI port. FIG. 7 shows a schematic diagram of a previous data frame F1 and a current data frame F2 received by the HDMI port 111 according to an embodiment of the present invention. The HDMI port 111 is not selected for display. In FIG. 7, the pixels in the data frames may or may not be compressed. In some embodiments, the pixels in the data frames may be compressed according to display stream compression (DSC) standard. DSC is a video compression algorithm to increase frame rates. However, since the pixels in the data frames are encapsulated in packets, how many of the pixels have been received by the HDMI port 111 is unknown without processing the packets. Therefore, after the power of the HDMI port 111 is turned off, the time to turn on the power may be estimated by approximating the number of pixels in the FRL domain according to the number of pixels in the TMDS domain.

In Step S601, the controller 120 turns on the power of the HDMI port 111 for a power-on period Ton2. The power-on period Ton2 includes at least the scrambler reset period TSR and the HDCP period. Details of scrambler reset period TSR and the HDCP period are explained in the subsequent paragraphs.

In Step S602, during the scrambler reset period TSR, the SR character is detected to descramble the current data frame F2. The scrambler reset period TSR is in the power-on period Tp in the previous data frame F1.

In Step S603, after the current data frame F2 is descrambled, the HDMI sink device 100 searches the descrambled current data frame F2 for the Vsync active edge Vsync2 to identify the start of the current data frame F2. A Vsync signal is the vertical synchronization signal of a data frame, and a Vsync active edge is the starting edge of the Vsync signal. The HDMI sink device 100 obtains HDCP information HDCP2 during the HDCP period. The HDCP period is between 512 to 528 pixels after the Vsync active edge. Vsync is the vertical synchronization signal. As shown in FIG. 7, the HDCP period HDCP2 is between 512 to 528 pixels after the Vsync active edge Vsync2, that is, 16 pixels in length. The HDCP information HDCP2 includes the information of the frame count and the data count. The HDCP information HDCP2 may be used to determine whether to decode the current data frame F2 if the HDMI sink device 100 switches from another HDMI port (e.g., the HDMI port 112) to the HDMI port 111 for displaying. If the HDCP information HDCP2 indicates that the current data frame F2 is HDCP-encrypted, the HDMI sink device 100 may increase the frame count by 1. If the HDCP information HDCP2 indicates that the current data frame F2 is not HDCP-encrypted, the HDMI sink device 100 may maintain the frame count.

In Step S604, the HDMI sink device 100 decodes the current data frame F2 using the HDCP information HDCP2, and detects a first active pixel P1 from the decoded current data frame F2. The pixel P1 is the first active pixel of the active region.

In Step S605, during the current data frame F2, the controller 120 turns off the power of the HDMI port 111 for a power-off period Toff2 upon detecting the first active pixel P1 in the current data frame F2 in Step S604. The pixel P1 is the first active pixel of the active region. The power of the HDMI port 111 is turned off until it is almost the time to detect the SR character and the HDCP information HDCP2, thereby saving the power. The power-off period Toff2 may be approximately 96% of the total time of a data frame.

The SR character is detected first to locate other SSBs and descramble the current data frame F2 in order to obtain the HDCP information from the descrambled current data frame F2. The scrambler reset period TSR is the duration needed to find the SR character. The scrambler reset period TSR can be calculated according to a character rate, a FRL rate and a frame rate. The scrambler reset period TSR may be expressed in lines by Equation Eq(1):

$$TSR=ceil(number\ of\ super\ blocks*number\ of\ characters\ of\ a\ superblock\ per\ lane*frame\ rate*total\ number\ of\ vertical\ lines/character\ rate) \qquad Eq(1)$$

where ceil( ) is a ceiling function.

For example, if the number of super blocks is 33, the character number of a superblock per lane is (510 characters of 1 character block*4 character block+4 SSB)/4 lane= (510+1), the frame rate is 60 Hz, the total number of vertical lines in a data frame is 2048, the character rate is FRL rate/18, and the FRL rate is $6*10^9$, the scrambler reset period TSR is 7 lines (=cell(33*511*60*2048*18/($6*10^9$))), indicating that 7 lines are needed to find the SR character SR.

Figure 8:
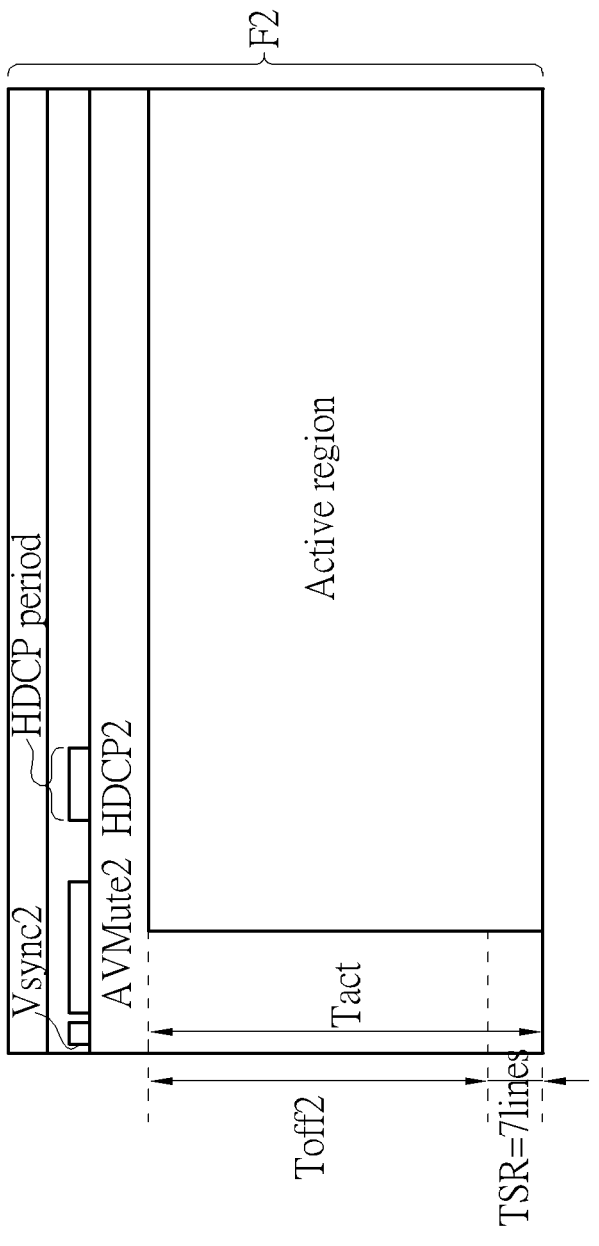
FIG. 8 shows a schematic diagram of the current data frame in FIG. 7 according to an embodiment of the present invention.

FIG. 8 shows a schematic diagram of the current data frame F2 in FIG. 7 according to an embodiment of the present invention. In this embodiment, the power-off period Toff2 is derived by subtracting the scrambler reset period TSR from the period Tact for displaying vertical active rows in the current data frame F2. For example, if the period Tact is 2048 lines and the scrambler reset period TSR is 7 lines, the power-off period Toff2 is 2041 lines (=2048-7). The HDMI sink device 100 may approximate the power-off period Toff2 to the time duration required for receiving 2041 lines of pixels using an internal clock without actually decoding the 2041 lines.

Figure 9:
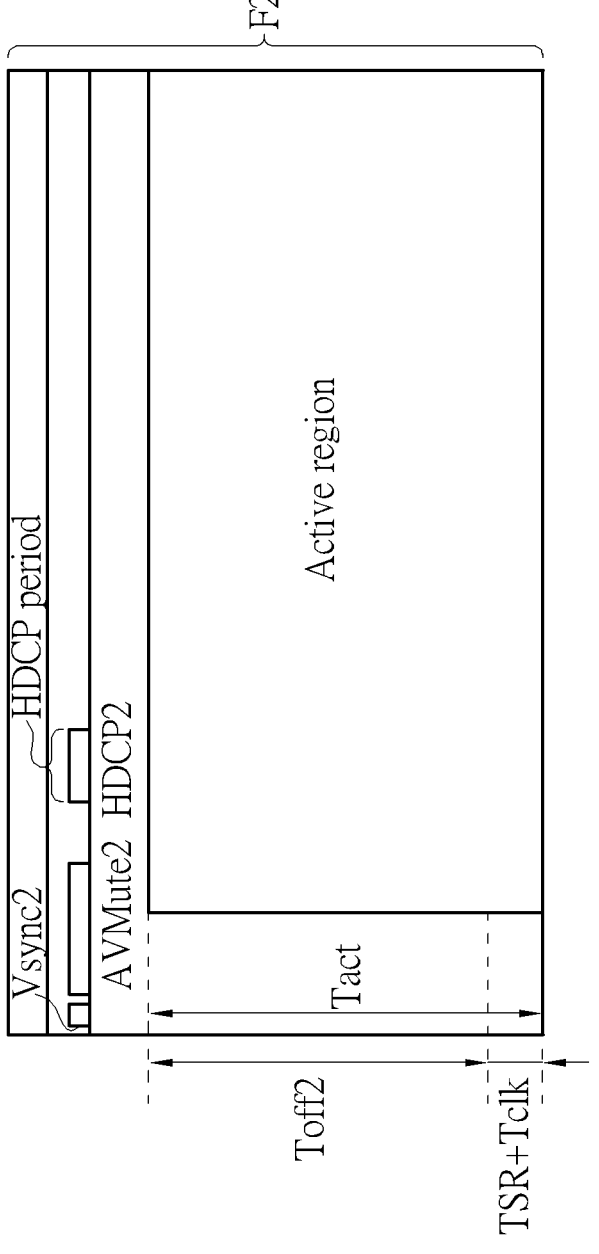
FIG. 9 shows a schematic diagram of the current data frame in FIG. 7 according to another embodiment of the present invention.

FIG. 9 shows a schematic diagram of the current data frame F2 in FIG. 7 according to another embodiment of the present invention. In this embodiment, the power-off period Toff2 is derived by subtracting the scrambler reset period TSR and a clock stabilization period Tclk from the period for displaying vertical active rows Tact in the data frame. In the clock stabilization period, the clock of the HDMI port is stabilized after wakeup.

Figure 10:
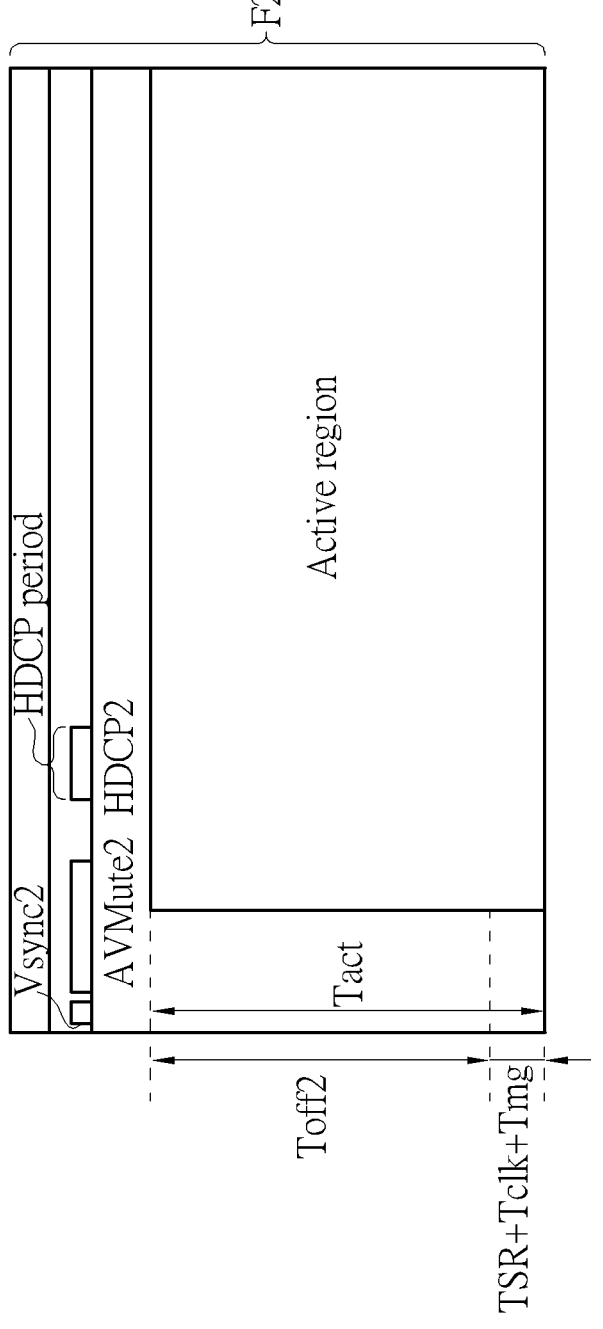
FIG. 10 shows a schematic diagram of the current data frame in FIG. 7 according to another embodiment of the present invention.

FIG. 10 shows a schematic diagram of the current data frame F2 in FIG. 7 according to another embodiment of the present invention. In this embodiment, the power-off period Toff2 is derived by subtracting the scrambler reset period TSR, the clock stabilization period Tclk, and a margin period Tmg from the period for displaying vertical active rows Tact in the data frame. The margin period Tmg corresponds to a maximum error (=492 tri-bytes) between the number of data transmitted in FRL tri-bytes and the number of data transmitted in TMDS tri-bytes, each tri-byte representing data of a pixel. Specifically, HDMI 2.1 data flow metering specifies that the FRL tri-byte rate is approximately equals to the TMDS tri-byte rate and the difference between the number of the FRL tri-byte rate and the number of the TMDS tri-byte is less than 492 tri-bytes. Since the FRL tri-bytes are transmitted in packet, the power-off period may be approximated by the number of TMDS tri-bytes received. For example, the pixels in the active region may be 4096×2048, the pixels in the scrambler reset period TSR may be 4096×7, the pixels in the clock stabilization period Tclk may be 4096×1, the pixels in the margin period Tmg may be 492, thus the HDMI sink device 100 may count the time duration of 8355384(=4096×2048−4096×7−4096−492) TMDS pixels in order to approximate the power-off period Toff2.

Figure 11:
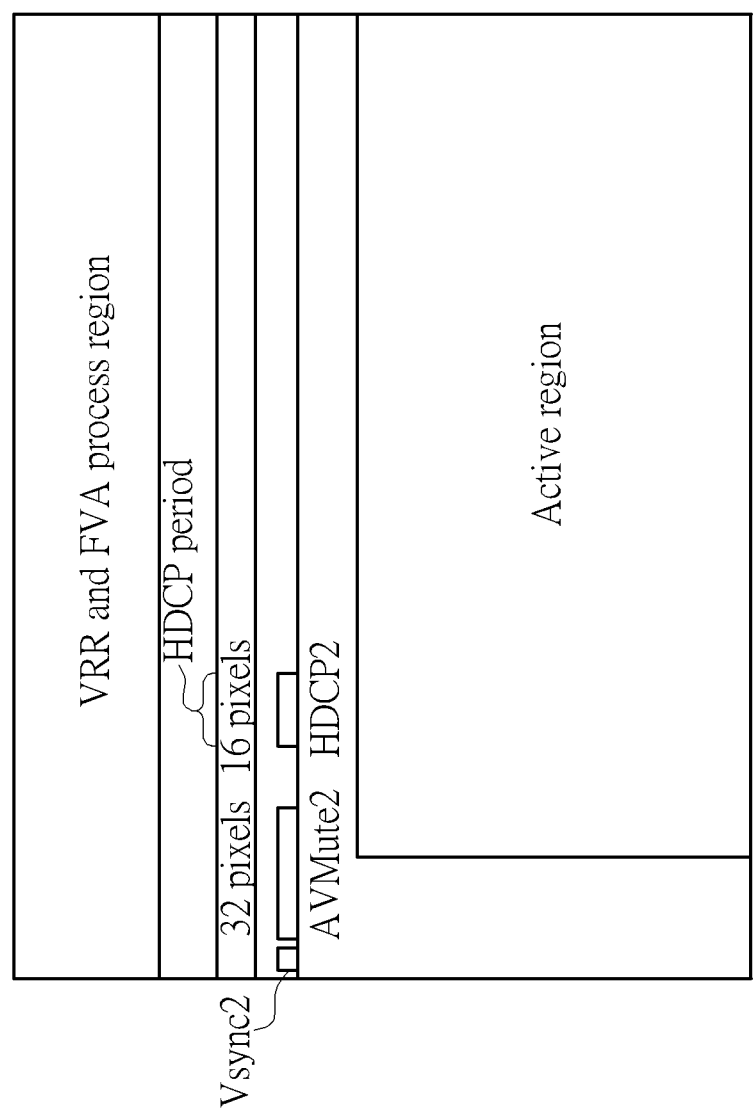
FIG. 11 shows a schematic diagram of the current data frame in FIG. 7 according to another embodiment of the present invention.

FIG. 11 shows a schematic diagram of the current data frame F2 in FIG. 7 according to another embodiment of the present invention. In FIG. 11, the current data frame F2 further comprises a plurality of blank lines as variable refresh rate (VRR) and Fast VActive (FVA) process region before a vertical synchronization Vsync2 active edge to achieve variable refresh rates. With VRR process, dynamic display can continuously and seamlessly change the refresh rate. A display supporting a specific range of refresh rates is called the variable refresh rate range (VRR range). With VRR process, the refresh rate can continuously vary seamlessly anywhere within this range. With FVA process, video frames may be sent faster from the source to the sink, thus reducing overall latency.

The embodiments of the invention disclose a power-saving method for switching HDMI ports on the HDMI sink device. The HDMI sink device receives data frames via FRL and turns off the power of the HDMI port for the power-off period upon detecting the first active pixel in the previous data frame, and turns on the power of the HDMI port for the power-on period upon completion of the power-off period. The present invention turns on the power only during HDCP synchronization and data descrambling, and turns off the power at most of the time during the active region of a data frame, thus reducing power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-saving method for switching High Definition Multimedia Interface (HDMI) ports on a sink device, the sink device having at least one HDMI port the method comprising:

receiving data frames in a fixed rate link (FRL) mode;

turning off a power of an HDMI port for a power-off period upon detecting an active pixel of the data frames in the FRL mode; and turning on the power of the HDMI port for a power-on period of the data frames in the FRL mode, wherein the power-on period of the data frames in the FRL mode comprises at least a scrambler reset period and a high bandwidth digital content protection (HDCP) enable information, wherein:

the power-off period is derived by subtracting the scrambler reset period, a clock stabilization period, and a margin period from the period for displaying vertical active rows in a data frame;

in the clock stabilization period, a clock of the HDMI port is stabilized after wakeup; and the margin period corresponds to a maximum error between a number of data transmitted in FRL tri-bytes and a number of data transmitted in Transition Minimized Differential Signaling TMDS) tri-bytes.

2. The method of claim 1, wherein the power-on period starts at a time point before the HDCP encryption enable information.

3. The method of claim 1, wherein the power-off period is derived by subtracting the scrambler reset period from a period for displaying vertical active rows in a data frame.

4. The method of claim 1, wherein the power-off period is derived by subtracting the scrambler reset period and a clock stabilization period from the period for displaying vertical active rows in a data frame; and in the clock stabilization period, a clock of the HDMI port is stabilized after wakeup.

5. The method of claim 1, further comprising:

during the scrambler reset period, detecting a scramble reset character to descramble a current data frame.

6. The method of claim 5, further comprising:

after the current data frame is descrambled, obtaining HDCP information during an HDCP period, the HDCP information being configured to decode the current data frame if the sink device switches from another HDMI port to the HDMI port for displaying.

7. The method of claim 5, wherein the current data frame further comprises a plurality of blank lines before a vertical synchronization active edge to achieve a variable refresh rate.

8. The method of claim 1, wherein active pixels in a data frame are compressed according to a display stream compression (DSC) standard.

9. The method of claim 1, wherein the data frames are transmitted between the sink device and a source device via a FRL 3-lane mode or a FRL 4-lane mode.

10. A High Definition Multimedia Interface (HDMI) sink device comprising:

at least one HDMI port; and a controller coupled to the at least one HDMI port, and configured to turn off a power of an HDMI port for a power-off period upon detecting an active pixel of the data frames in the FRL mode; and turn on the power of the HDMI port for a power-on period of the data frames in the FRL mode;

wherein:

the power-on period of the data frames in the FRL mode comprises at least a scrambler reset period and a HDCP enable information;

the power-off period is derived by subtracting the scrambler reset period, a clock stabilization period, and a margin period from the period for displaying vertical active rows in a data frame;

a clock of the HDMI port is stabilized after wakeup in the clock stabilization period; and the margin period corresponds to a maximum error between a number of data transmitted in FRL tri-bytes and a number of data transmitted in Transition Minimized Differential Signaling (TMDS) tri-bytes.

11. The HDMI sink device of claim 10, wherein the power-on period starts at a time point before the HDCP encryption enable information.

12. The HDMI sink device of claim 10, wherein the power-off period is derived by subtracting the scrambler reset period from a period for displaying vertical active rows in a data frame.

13. The HDMI sink device of claim 10, wherein the power-off period is derived by subtracting the scrambler reset period and a clock stabilization period from the period for displaying vertical active rows in a data frame; and a clock of the HDMI port is stabilized after wakeup in the clock stabilization period.

14. The HDMI sink device of claim 10, further comprising:

a detector detecting a scramble reset character to descramble a current data frame during the scrambler reset period;

wherein the current data frame further comprises a plurality of blank lines before a vertical synchronization active edge to achieve a variable refresh rate.

15. The HDMI sink device of claim 14, further comprising:

after the current data frame is descrambled, obtaining HDCP information during an HDCP period, the HDCP information being configured to decode the current data frame if the sink device switches from another HDMI port to the HDMI port for displaying.

16. The HDMI sink device of claim 10, wherein active pixels in a data frame are compressed according to a display stream compression (DSC) standard.

* * * * *